Nov. 9, 1965 JIRO OKUDA ETAL 3,217,179

PULSE CONTROLLED TIMING CIRCUIT FOR MONOSTABLE MULTIVIBRATOR

Filed July 11, 1962 2 Sheets-Sheet 1

INVENTORS
JIRO OKUDA
SHIGEMI TANAKA
BY
OSTROLENK, FABER, GERB & SOFFEN
ATTORNEYS

PULSE CONTROLLED TIMING CIRCUIT FOR MONOSTABLE MULTIVIBRATOR

Filed July 11, 1962 2 Sheets-Sheet 2

INVENTOR.
JIRO OKUDA
SHIGEMI TANAKA
BY
OSTROLENK, FABER, GERB & SOFFEN
ATTORNEYS

United States Patent Office 3,217,179

Patented Nov. 9, 1965

3,217,179

PULSE CONTROLLED TIMING CIRCUIT FOR MONOSTABLE MULTIVIBRATOR

Jiro Okuda and Shigemi Tanaka, Shiba Mita, Minatoku, Tokyo, Japan, assignors to Nippon Electric Company Limited, Tokyo, Japan Filed July 11, 1962, Ser. No. 209,096
2 Claims. (Cl. 307—88.5)

This invention relates to electronic circuits and more particularly to a time controlling circuit for monostable transistorized multivibrators formed basically of a two-state transistor amplifier having a regenerative R-C feedback circuit.

The operating principles and the design of such monostable multivibrators are well known in the art and they have been fully described in various publications, including the following: "Electronic and Radio Engineering," by F. E. Terman, published in 1955, pages 795 and 796 and related matter in sections 18–4 and 18–5; "Transistor Circuit Engineering" by R. F. Shea, particularly paragraph 10.7.1 and related matter in paragraphs 10.6.1 to 10.7 thereof; "Junction Transistor Electronics" by R. B. Hurley, paragraph 21.3.2 and related matter in paragraphs 21.1 to 21.3.1, published in 1957 and 1959 respectively; and United States Army Technical Manual No. T.M. 11–690 entitled "Basic Theory Application of Transistors," published March 1959 by U.S. Government Printing Office, paragraph 191 and related matter in paragraphs 180 through 199. Since such monostable transistor multivibrators are well known, their principles and operation need not be further explained herein and the contents of the above identified publications relating to operating principles are hereby incorporated herein by reference thereto.

As is known, any astable or free running multivibrator may be rendered monostable by unbalancing one of the two feedback circuits provided therein, which in the quiescent state maintains one transistor (or vacuum tube) in non-conducting off condition and the other transistor (vacuum tube) in the saturated on condition. Upon application of a trigger impulse to such monostable multivibrators, the conductivity condition of its two transistors (vacuum tubes) is suddenly reversed and maintained reversed for a predetermined duration, for generating a timed output pulse having a predetermined pulse duration or width, which is essentially independent of the trigger signal pulse width and which is determined by the R-C time constant of the multivibrator differential circuit.

For proper operation of the monostable multivibrator it is important that each trigger pulse applied to the trigger circuit elements thereof shall produce the output pulse of the desired predetermined duration. However, for proper operation of such monostable multivibrators, the value of the capacitor of the differential circuit must be considered in relation to the changes in the input wave shape of the trigger pulse for securing an output pulse of the required time duration. Furthermore, there is a risk of producing an erroneous output pulse because of improper operation of the trigger circuit, due to a noise voltage, which risks should be avoided.

Among the objects of the instant invention is the provision of a D.C. biasing circuit for monostable transistor multivibrators which eliminates the difficulties heretofore encountered in securing high reliability of their operation and in delivering the desired pulses of the required predetermined time duration in response to trigger pulses applied thereto. This operation occurs irrespective of the changes in the wave shape of the applied trigger pulse and free of the risk of producing erroneous output pulses due to noise or other type voltages. In accordance with the invention, these difficulties are eliminated and highly reliable operation of such monostable multivibrators is obtained by applying the appropriate signals thereto through the aforementioned special input circuit which includes a rectifying means, a predetermined direct current bias potential which elements are controlled by impressed input trigger pulses in a novel manner. Rectifying means may be formed either by a standard rectifier element only, or by the rectifying base-emitter junction which constitute two electrodes of a three electrode transistor, wherein the third transistor electrode has impressed thereon the applied direct current bias potential or, by a vacuum tube which is designed to be the electronic equivalent of the transistor mentioned above.

The controlled bias circuit of the instant invention may be applied to any one of the known monostable oscillators, including those mentioned in any one of the above mentioned publications and their modifications and accordingly the operating elements, features and operations of such known monostable transistor multivibrators need not be further described herein. However, it should be noted that the input trigger pulse circuit to be used in the arrangement of the instant invention is simpler than that required in prior art devices in that the instant invention is so designed as to avoid the need of D.C. blocking means in the trigger input circuit.

The instant invention is comprised of a rectifying means which is connected to the input control electrode of one of the transistors (vacuum tubes) of a monostable multivibrator circuit. The remaining terminal of the rectifying means is connected to a D.C. potential via an impedance means. The common terminal of the rectifying means and the impedance means is connected to a switch means, which is adapted to apply the circuit reference voltage to said common terminal at predetermined intervals. The switch means operates as the input control for the multivibrator circuit and is adapted to have impressed thereon signals representative of trigger pulses whose time duration is to be measured by the circuit of the instant invention.

When the switch means is operated so that no reference voltage level is applied to the aforementioned common terminal, the D.C. source is coupled to the rectifying means via the impedance means and causes the normally conductive transistor (vacuum tube) to remain in its conductive state regardless of the magnitude or duration of input pulses impressed upon the monostable multivibrator input control terminal.

However, once its switch means is operated to its closed condition, the D.C. bias is removed from the rectifying means thereby enabling the normally conducting transistor (vacuum tube) to make the transition to its non-conductive state after a predetermined time duration. This time duration is determined by the differential R-C circuit of the multivibrator. At the end of this predetermined time duration the normally conducting transistor is enabled to return from the non-conductive state to its normally conducting state, thus enabling the monostable multivibrator circuit to change state in response to input trigger pulses impressed upon its input control terminal. However, trigger pulses impressed upon the input control terminal during the time that the switch means is in the opened position, plus the predetermined time period after said switch means moves to its closed position. The monostable multivibrator circuit is unable to change its state in response to input trigger pulses. Thus, it can be seen that the circuit of the instant invention provides a means for identifying the occurrence of input trigger pulses at predetermined time intervals and ignoring input trigger pulses occurring at any other time intervals while the bias controlling circuit is in a first condition; and for recognizing input trigger pulses occurring at shorter time intervals between each pulse when the bias controlling circuit is in a second biasing condition.

Since the circuit is able to distinguish pulses occurring at predetermined time intervals from all other input pulses, there is no necessity for providing D.C. blocking means at the input control terminal of the circuit.

It is therefore one object of this invention to provide a novel timing circuit for a monostable multivibrator which is so adapted as to enable the multivibrator to distinguish pulses occurring at certain predetermined time intervals from pulses occurring at other time intervals.

Another object of this invention is to provide a timing circuit for a monostable multivibrator arrangement wherein the timing circuit is adapted to assume a first condition enabling the multivibrator to distinguish input pulses occurring at predetermined time intervals from input pulses not occurring at said time intervals and further adapted to assume a second condition enabling the multivibrator to recognize the occurrence of all input pulses regardless of their time occurrence.

The foregoing and other objects of this invention will be best understood from the following description of exemplifications thereof reference being had to the accompanying drawings wherein.

Figure 1:
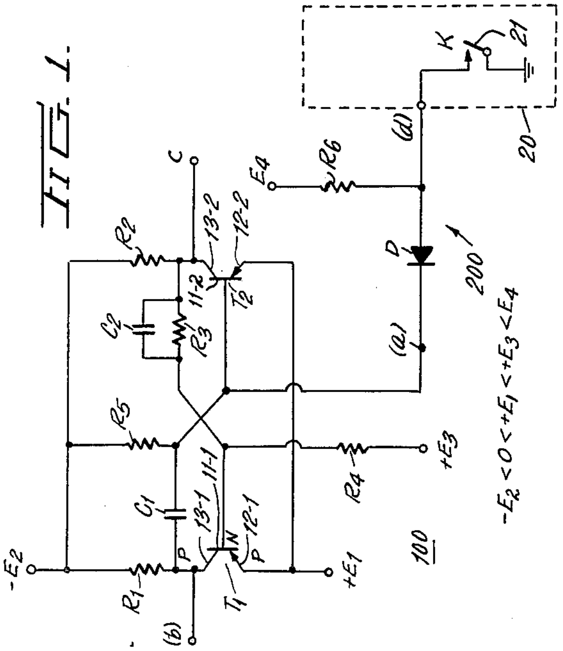
FIGURE 1 is a schematic diagram of a monostable multivibrator employing the timing circuit of the instant invention.

Referring now to the drawings, FIGURE 1 shows a circuit diagram of an example of one of the various known monostable transistor multivibrators in connection with which the trigger circuit of the present invention will be described hereinafter. The monostable multivibrator of FIGURE 1 operates with two transistors $T_1$ and $T_2$ which are connected in a circuit essentially similar to that shown and explained in connection with FIGURE 194 in paragraph 191 of the above referred to Army Technical Manual T.M. 11–690 and its known mode of operation need not be described herein for the purposes of clarity. The transistors $T_1$ and $T_2$ have bases 11–1, 11–2, emitters 12–1, 12–2 and collectors 13–1, 13–2 respectively. The emitters 12–1 and 12–2 of transistors $T_1$ and $T_2$ are directly connected to one another and to an energy source, $+E_1$ which is designed to impress the required operating and bias potential to the emitter terminals 12–1 and 12–2 respectively.

Collector 13–1 of transistor $T_1$ is connected through resistance $R_1$ to a negative voltage source $-E_2$. This voltage source is likewise connected to the collector 13–2 via resistor $R_2$. A capacitor $C_1$ provides the collector to base connection between transistors $T_1$ and $T_2$. The parallel connected components comprising resistor $R_3$ and capacitor $C_2$ provide the collector to base connections between transistors $T_2$ and $T_1$ respectively. The base 11–1 of transistor $T_1$ is connected through resistance $R_4$ to a positive voltage source $+E_3$. The base of transistor $T_2$ is connected to the cathode-electrode of a diode member D, the anode terminal of which is connected through a resistor $R_6$ to a positive voltage source $E_4$. The terminal connecting the anode of diode D to resistance $R_6$ is connected to one terminal of a switching mechanism 20, which is employed to control the voltage level at the anode terminal *d* of the diode member D. Although the switching member 20, shown in FIGURE 1, is schematically represented by a single-pole, single-throw switch mechanism 21, it should be understood that this switching arrangement may be performed by any comparable switch means, such as for example, well known electronic switches available to the prior art.

In the conventional monostable multivibrator circuits used to perform a timing function, the timing action is initiated by a suitable trigger pulse which is imposed upon the base of the normally conducting transistor. In the circuit shown in FIGURE 1, this would be the transistor $T_1$, the input trigger signal being impressed via resistor $R_4$ upon the base electrode 11–1. Such an input trigger signal is necessarily impressed through a capacitive coupled network upon the free terminal, or input terminal of resistance $R_4$. The capacitor being employed to improve the shortness of the input trigger pulse. With such operation it is necessary to take into consideration the magnitude of the coupling capacitor necessary for such an input trigger operation. This is true since the magnitude of the capacitor substantially affects both the operating characteristics of the circuit and the inherent cost of the circuitry. Another disadvantage of such a circuit arrangement of the prior art is, if any noise impulse should appear at the trigger input of conventional monostable multivibrators, there is no way of preventing the occurrence of such an accidental timing action which would be triggered by the noise signal impressed upon the input terminal.

The instant invention is superior to such conventional circuits and is characterized by providing an arrangement which, conversely to such prior art circuitry, controls the monostable multivibrator at the base electrode of the normally cut-off transistor. In the circuit shown in FIGURE 1, this pertains to the base 11–2 of the normally cut-off transistor $T_2$. A control operation is performed by means of a D.C. potential at the input terminal thereof, thus satisfactorily suppressing the influence of the input waveform, the input trigger pulse time interval, and a noise voltage, since the application becomes that of impressing a D.C. control voltage to the monostable multivibrator as opposed to a trigger impulse signal.

FIGURE 1 will hereinafter be considered in describing the principle of the instant invention. As in conventional monostable multivibrators the circuit 100 of FIGURE 1 comprises transistors $T_1$ and $T_2$, resistors $R_1$–$R_5$ and capacitors $C_1$ and $C_2$. The base of the transistor $T_2$ is employed as a D.C. control terminal and is connected to the potential setting circuit 200, which controls the circuit operation. To start the timing action of the subject monostable multivibrator, the operation is as follows:

Just prior to the initiation of the timing operation, the input control means, or switch means 20, is in the position shown in FIGURE 1. In this condition a positive voltage source $E_4$ is impressed upon the anode of diode D. Since the relationship of the voltage sources employed in the circuit of FIGURE 1 are $-E_2$, is less than 0, is less than $+E_1$, is less than $+E_3$, is less than, or equal to $+E_4$, this means that with the switch means 20, in the position shown in FIGURE 1, a positive bias is impressed upon the diode D and hence upon the base electrode 11–2 of transistor $T_2$. Voltage source $+E_4$ being greater than voltage source $+E_1$, transistor $T_2$ remains in its cut-off state (since it is a PNP transistor), the timing operation is initiated by closing switch means 20 thus imposing zero volts or ground potential to the terminal *d* of diode D. This causes the diode D to be reversely biased thereby presenting an extremely high resistance across the terminals of diode D. Immediately prior to closure of switch means 20, transistor $T_1$, being in the conductive state, and thereby being substantially saturated, has its collector terminal 13–1 substantially clamped at the voltage level $+E_1$ (assuming substantially negligible voltage drop across transistor $T_1$). This saturated condition substantially acts to clamp the terminal of capacitor $C_1$ connected to the collector electrode 13–1. The opposite terminal of capacitor $C_1$, immediately prior to imposition of ground potential at terminal *d*, is substantially clamped at the voltage level $+E$, which is, as was previously described, equal to $E_4$ or somewhat less than voltage $E_4$. Thus in this condition capacitor $C_1$ has a charge stored across its electrodes. With the closing of switch means 20 a ground potential upon terminal *d* causes diode D to present an extremely high impedance to capacitor $C_1$ thereby enabling it to discharge through resistor $R_5$. $C_1$ starts discharging at a rate determined by the time constant $C_1$–$R_5$. The discharge of the capacitor $C_1$ continues until the voltage at terminal *a* (i.e. base elctrode 11–2) is less than the voltage $+E_1$. When this occurs, the transistor $T_2$, being a PNP transistor, begins to conduct thus causing the voltage levels at terminals *b* and *c* to reverse their potential levels. This is due to the fact that with the conduction of transistor $T_2$ the collector electrode 13–2 of transistor $T_2$ comes more positive, which voltage is impressed upon base electrode 11–1 causing a regenerative action whereby transistor $T_1$ is driven towards cut-off while transistor $T_2$ is driven towards saturation.

Figure 3:
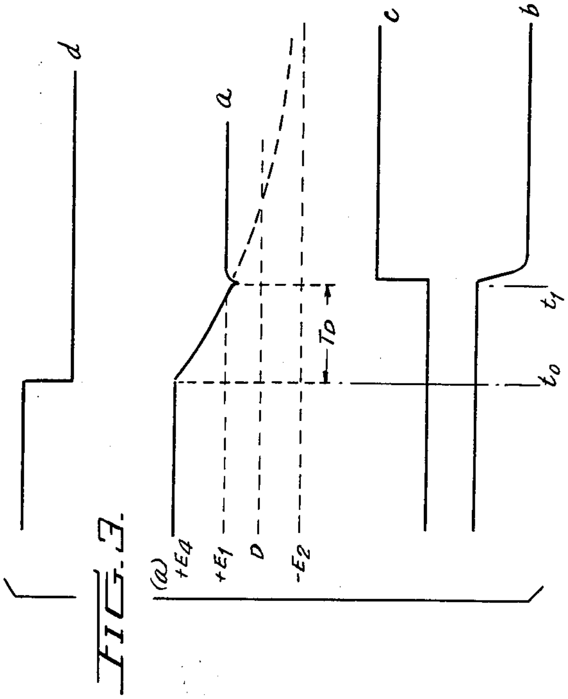
FIGURE 3 shows some of the waveforms generated by the circuit of FIGURE 1 under control of the timing circuit.
Figure 4:
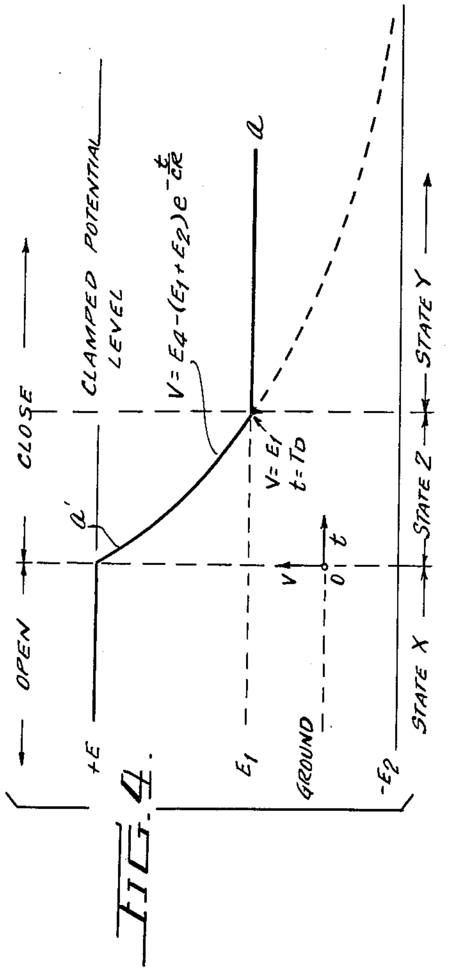
FIGURE 4 is a detailed enlarged drawing of one of the waveforms shown in FIGURE 3.

This operation can also be followed when considering the waveform shown in FIGURE 3 and further the enlarged waveform shown in FIGURE 4. Immediately prior to time $T_0$ the voltage at terminal *d* is substantially at $+E_4$ as shown by waveform D in FIGURE 3. Since this voltage level forward biases diode D the voltage level at terminal *a* is also substantially at $+E_4$ as shown by waveform *a* of FIGURE 3. Terminals *b* and *c* are at voltage levels $+E_1$ and $-E_2$, respectively, as shown by waveforms *b* and *c* of FIGURE 3, representing the conducting and cut-off states respectively of transistors $T_1$ and $T_2$. At time $T_0$ upon the closure of switch means 20, the voltage at terminal *d* drops to zero, causing capacitor $C_1$ to discharge, as shown by the portion *a'* of waveform *a* shown in FIGURE 3. The discharging of capacitor $C_1$ continues until the voltage at the terminal *a* and consequently the base electrode 11–2 dips below the voltage level $+E_1$ which negative spike occurs at the time $T_1$. This causes the voltage level reversals at collector electrodes 13–1 and 13–2, as shown by waveforms *b* and *c* respecitvely, of FIGURE 3. As shown in FIGURE 4, the portion *a'* of the curve *a'* which is identical to the curve *a* shown in FIGURE 3, sets forth the expression for the portion *a'* of the waveform *a*. It should be noted that the time period $T_d$ (i.e. $T_1-T_0$) is determined strictly by the time constant $C_1$–$R_5$, and may be selected to be of any desired length of time.

The time $T_d$ in which the voltage level reversals of collectors 13–1 and 13–2 take place is determined by the following equation:

$$T_d=C_1R_5 \ln \frac{E+E_2}{E_1+E_2}$$

Figure 5:
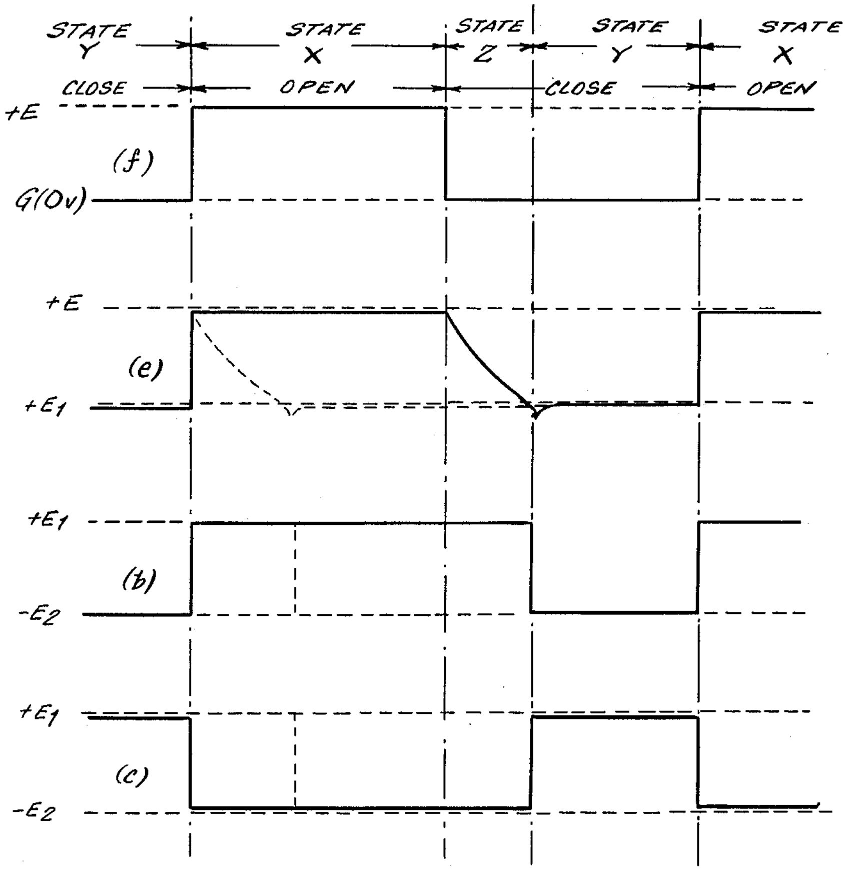
FIGURES 5 and 6 show two additional sets of waveforms employed in describing the instant invention.

Referring now to FIGURE 5, the waveform (F) shows the voltage at terminal *d* of the circuit of FIGURE 1, which is shown being controlled in a periodic square wave fashion. Waveform *e* shows the voltage changes which are undergone at terminal *a* of the circuit of FIGURE 1 and waveforms *b* and *c* show the voltages developed at the collector electrodes 13–1 and 13–2 of the multivibrator circuit 100. It will now be appreciated that the D.C. controlled multivibrator 100 of FIGURE 1 has two stable states which are designated state *x* and state *y* as shown in FIGURE 5, and a transient state designated state *z*, as shown in FIGURE 5. Referring first to state *x*, in this particular condition, switch means 20 is in the open position causing the diode D to present a high impedance to the multivibrator circuit, thereby effectively clamping the base electrode 11–2 at the voltage level $E_4$. This is shown by waveform *a* in FIGURE 5.

The transient state is entered into at time $T_0$ by closure of switch means 20, thereby impressing ground potential upon terminal *d*. This is shown by waveform D at time $T_0$. This causes capacitor $C_1$ to discharge, as shown by portion *a'* of waveform *a* in FIGURE 3, and as was previously described wherein the discharge takes place over a time period $T_1-T_0$, which is equal to $T_d$. At this instant of time (i.e. $T_1$), the voltage of the base electrode 11–2 of transistor $T_2$ becomes more negative than the base voltage $+E_1$ causing a regenerative action which drives transistor $T_2$ into saturation and transistor $T_1$ into cut-off. This is shown by the waveforms *c* and *b*, respectively, of FIGURE 5. Therefore, at time $T_1$ until time $T_2$ the D.C. controlled circuit 100 of FIGURE 1 is in the state *y* and the transistor $T_2$ remains in the saturated state while transistor $T_1$ remains in the cut-off state, as represented by the portions *b'* and *c'*, respectively, of the waveforms *b* and *c* of FIGURE 5. State *y* is maintained until switch means 20 is returned to the open state, namely, state *x*.

Figure 6:
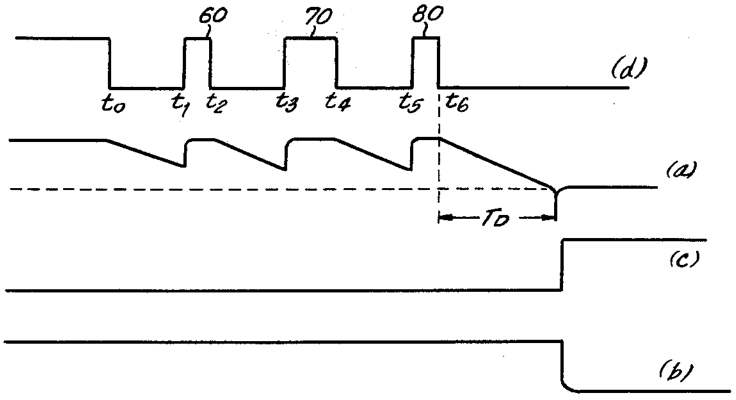

The unique results are obtainable by the D.C. controlled multivibrator circuit 100, shown in FIGURE 1 and can best be explained by referring to the waveform shown in FIGURE 6. The waveform D of FIGURE 6 represents the control of switch means 20 so as to form the pulses 60, 70 and 80, which pulses can be seen to be of varying pulse width and of varying spacing. Considering the normal monostable multivibrator, for a moment, it can be appreciated that with intermittent pulses entering the input terminal of normally operating monostable multivibrators, the multivibrator circuit will be moved to its unstable state with each pulse arriving at its input terminal since the time constant of the circuit is substantially smaller than the times between successive pulses, due to the fact that these pulses are impressed upon the base electrode of the normally conducting transistor. In the instant device, however, the pulses enter upon the base electrode 11–2 of the normally non-conducting transistor via the D.C. controlled circuit 200, such that the multivibrator circuit is not altered by successive input pulses, which follow within a given time interval smaller than the time interval $T_d$ after the initiating trigger pulse. The explanation of this operation is as follows:

At time $T_0$, zero voltage level is impressed upon the terminal *d* causing capacitor $C_1$ to begin its discharge as shown by waveform *a* of FIGURE 6, however, at time $T_1$ a positive voltage level $+E_4$ is impressed upon the terminal *d* of circuit 100, causing capacitor $C_1$ to charge instantaneously. As can be seen, the time period, $T_1-T_0$ is less than the time period $T_d$ so that the discharge of capacitor $C_1$ never reaches or goes below the voltage level $+E_1$. Thus at time $T_1$ no change occurs in the voltage levels at the collector electrodes 13–1 and 13–2 of multivibrator circuit 100. Again, at time $T_2$, zero voltage level is impressed upon terminal *d* of circuit 100, again causing capacitor $C_1$ to begin discharging, however, positive voltage level $+E_4$ is impressed at time $T_3$ again preventing capacitor $C_1$ from discharging so as to drive terminal *a* below the $+E_1$ voltage level so that capacitor $C_1$ charges instantaneously up to the $+E_4$ voltage level, as shown by waveform *a* at time $T_3$. It can be appreciated that the same operation occurs again at the times $T_4$ and $T_5$, since the time period $T_5-T_4$ is less than the time period $T_d$. However, a time $T_6$ when zero voltage level is again impressed upon the terminal D of D.C. controlled monostable multivibrator circuit 100, capacitor $C_1$ again begins to discharge and due to the fact that no further pulses are impressed upon input terminal *d*, as shown by waveform D in FIGURE 6. Due to the discharge of capacitor $C_1$ terminal *a* is now enabled to drop below the $+E_1$ voltage level, causing the collector electrodes 13–1 and 13–2 to change their states, as shown by waveforms *b* and *c*, respectively, of FIGURE 6.

Figure 2:
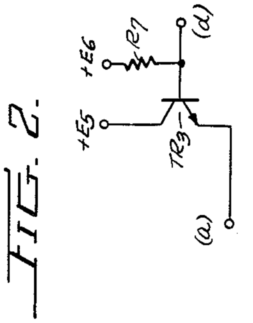
FIGURE 2 shows another preferred embodiment of the timing circuit of FIGURE 1.

For some operations, it is preferable to shorten the charging time for capacitor $C_1$ by using the input potential setting circuit 200', shown in FIGURE 2, which circuit is comprised of an NPN transistor $T_3$, having its collector electrode connected to a positive voltage source $+E_5$ and its base electrode connected through a resistor $R_7$ to a positive voltage source $+E_6$. The emitter electrode is connected to terminal *a* of FIGURE 1 and substituted for the potential setting circuit 200 of FIGURE 1. Terminal D of potential setting circuit 200' is connected to the output terminal of switch means 20. The operation with this potential setting circuit is similar to that previously described, wherein with the switch means 20, shown in the open position, voltage $+E_6$ is impressed upon the base electrode of transistor $T_3$ causing transistor $T_3$ to conduct. This clamps terminal *a* at substantially the voltage level $+E_5$ with switch means 20 moved to the closed position, zero potential is impressed upon the base electrode of transistor $T_3$ causing transistor $T_3$ to be cut-off thereby presenting a high impedance at terminal *a* of the monostable multivibrator circuit 100. The advantage of the circuit of FIGURE 2, however, is that a very low impedance is impressed upon the terminal *a* during the time when transistor $T_3$ is in saturation, thereby enabling capacitor $C_1$ to be recharged at a very rapid rate.

It can be appreciated that this invention may be advantageously applied in dial pulse timing circuits of electronic exchange registers employed in telephone operations since the circuit can most effectively detect the minimum pause or abandoned call conditions, or further, may count dial pulses completely unaffected by a chattering of relay contacts and other serious noises. The circuit, as employed, has a time range in the transient state *z*, ranging from several microseconds to several tens of seconds and such ranges can readily be obtained simply by altering the values of capacitors $C_1$ and resistor $R_5$ in the appropriate manner.

It can therefore be seen that this invention provides a novel D.C. controlled timing circuit which has the ability of recognizing the presence of pulses which are separated by a predetermined distance and ignoring those which are separated by lesser time distances.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Circuit means for indicating only the presence of pulses separated by a time duration greater than time $T_D$ and for providing no indication of pulses separated by time duration less than time $T_D$ comprising first and second transistor means each having base, emitter and collector electrodes; first bias means connected in common to the emitter electrodes of said first and second transistor means; second bias means, first and second resistance means having first terminals connected to sad second bias means and second terminals connected to the respective collector electrodes of said first and second transistor means; first capacitance means connected between the collector electrode of said first transistor means and the base electrode of said second transistor means; third resistance means connected in parallel with second capacitor means and further being connected between the base electrode of said first transistor means and the collector electrode of said second transistor means; third bias means; diode means; fourth resistance means connected between said third bias means and the anode of said diode means; the cathode of said diode means being connected to the base of said second transistor means and being forward biased to normally maintain said second transistor means in the cut-off state and said first transistor means in the conducting state; switch means connected between the anode of said diode means and ground potential and being capable of assuming an open and a closed state; said second transistor means being in cut-off condition when said switch means is in the open state; the output of said circuit appearing at the collector electrode of said second transistor means; fifth resistance means connected between the base electrode of said second transistor means and said second bias means enabling said first capacitance means to discharge through said fifth resistance means when said switch means is closed; said discharge rate being determined by the values of said fifth resistance means and said first capacitance means; said second transistor means moving from the cut-off state to the conductive state at a time $T_D$ after closure of said switch means to abruptly change the voltage level at said circuit output whereby subsequent opening of switch means prior to the termination of time $T_D$ will not alter the voltage level at said circuit output.

2. In a circuit as claimed in claim 1 further comprising a fourth biasing means, and said diode means comprising the base emitter junction of a transistor having base emitter and collector electrodes, said emitter connected to the base of said second transistor, the base connected to said switch means and the collector connected to said fourth biasing means.

References Cited by the Examiner

UNITED STATES PATENTS

| | | | |
|---|---|---|---|
| 2,986,649 | 5/61 | Wray | 307—88.5 |
| 3,045,127 | 7/62 | Carey | 307—88.5 |
| 3,047,737 | 7/62 | Kolodin | 307—88.5 |
| 3,081,419 | 3/63 | Simon | 307—88.5 |
| 3,102,986 | 9/63 | Harper | 307—88.5 |

JOHN W. HUCKERT, *Primary Examiner.*